F. ORTH.
REGENERATOR CONSTRUCTION.
APPLICATION FILED OCT. 4, 1915.
1,233,114.
Patented July 10, 1917.
3 SHEETS—SHEET 1.
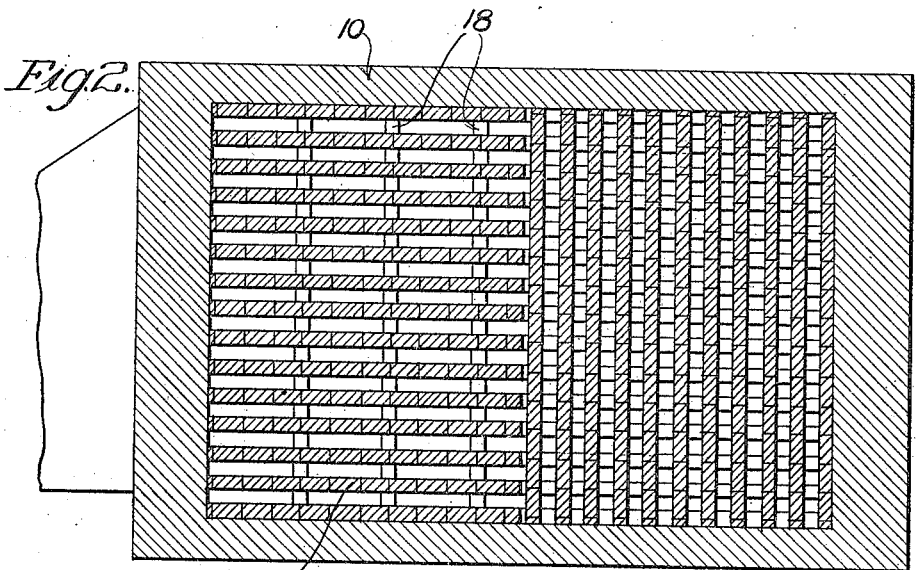
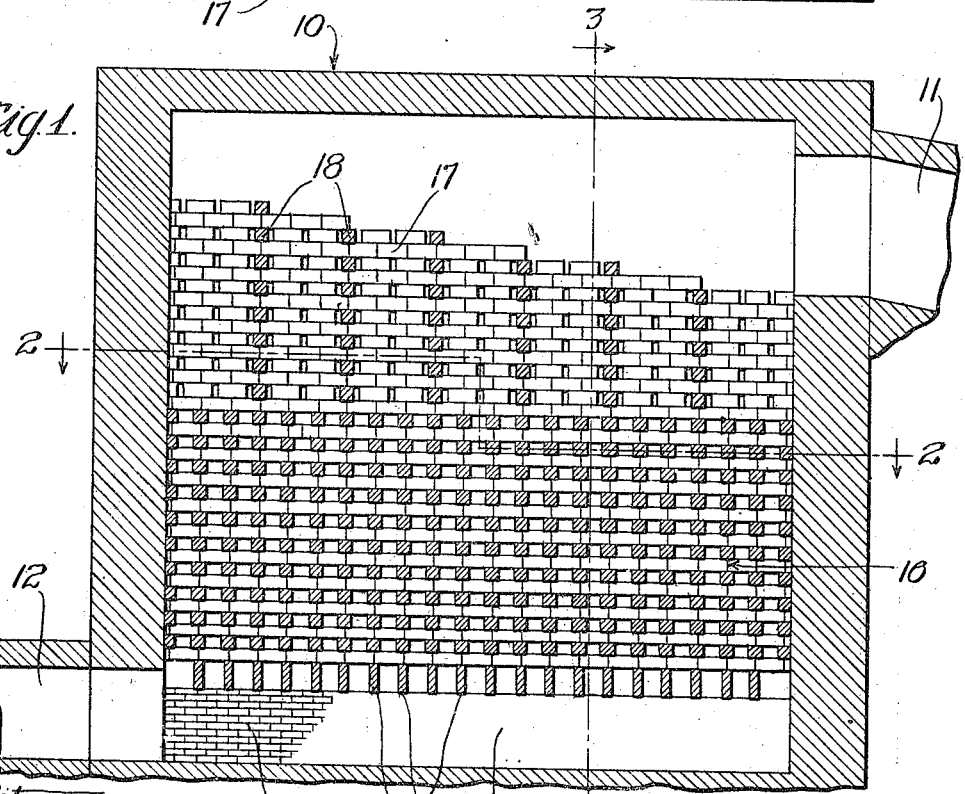

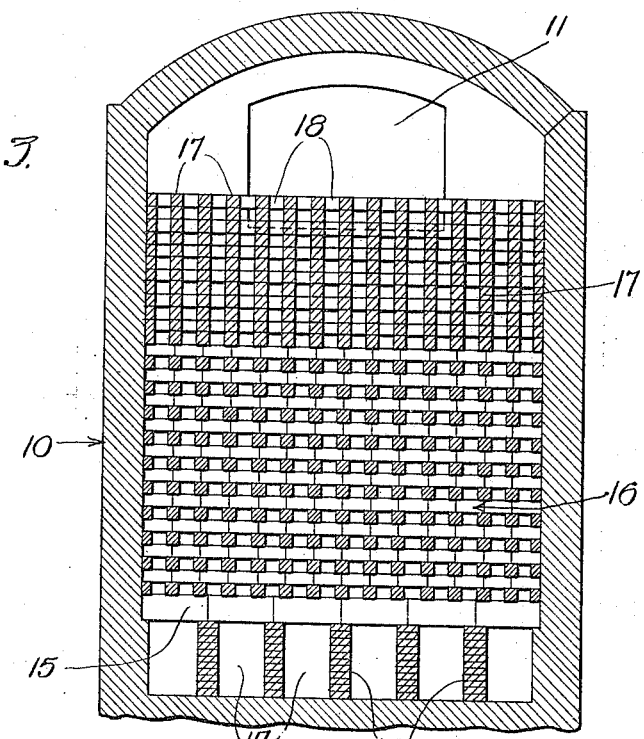
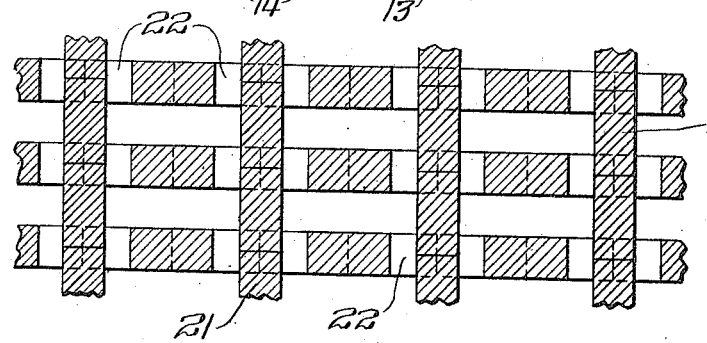
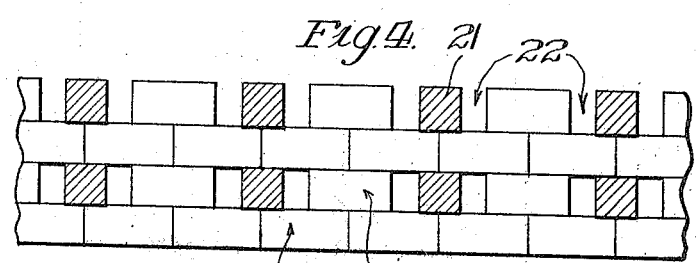

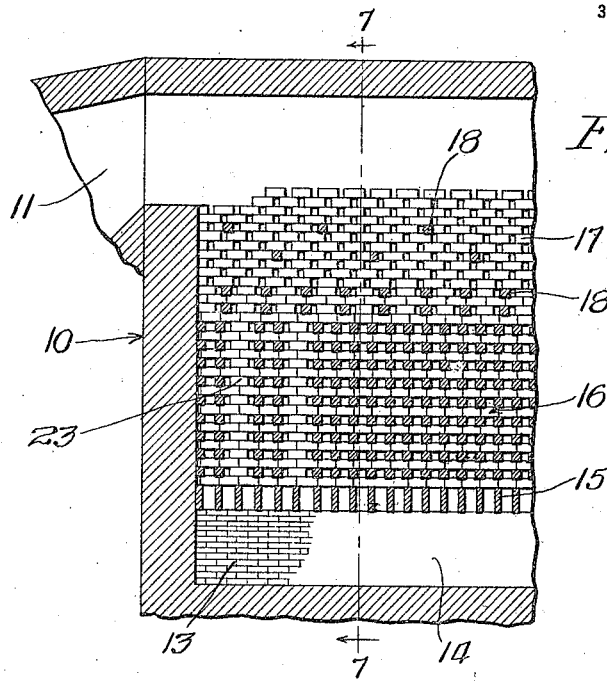
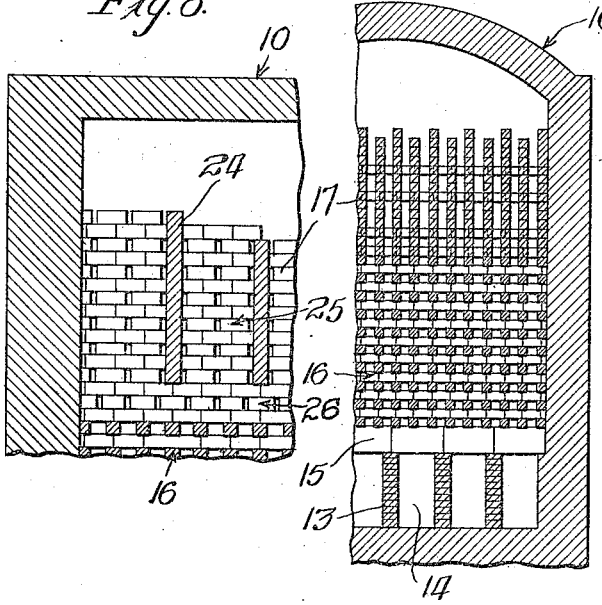
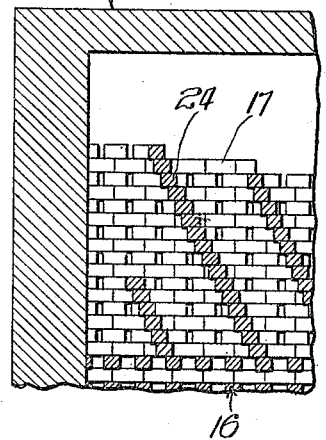

UNITED STATES PATENT OFFICE.

FRANK ORTH, OF INDIANA HARBOR, INDIANA.

REGENERATOR CONSTRUCTION.

1,233,114.  Specification of Letters Patent.  Patented July 10, 1917.

Application filed October 4, 1915. Serial No. 54,052.

*To all whom it may concern:*

Be it known that I, FRANK ORTH, a citizen of the United States, residing at Indiana Harbor, county of Lake, and State of Indiana, have invented certain new and useful Improvements in Regenerator Constructions, of which the following is a specification.

The present invention has reference to certain improvements in regenerator constructions of that type which is very well adapted for service in connection with open-hearth and similar furnaces. It will presently appear, however, that the features of the invention may be used in other classes of service than those particularly enumerated.

In the operation of a regenerator with gas from open-hearth furnaces and the like, the dust carried over in the gases tends to stick or adhere to the surface of the heat absorbing material on the incoming side of the regenerator. This tendency to adhere is dependent among other things upon the temperature of the gases, their velocity, and the form of the obstructions which they encounter as they pass through the regenerator. The tendency to adhere to the heat absorbing material is always greatest on the incoming side because the gases are hottest on that side of the regenerator.

By keeping the velocity of the gases relatively low, the tendency for them to cinder on or adhere to the regenerator material will be reduced. The velocity of the gases as they pass through the regenerator material will depend among other things upon the size of the gas openings in said material. It is therefore desirable to have these openings as large as possible on the incoming side where the gases are hottest. However, in the ordinary type of construction large openings can only be scured at a sacrifice of regenerator material, cutting down the total amount of heat absorbing material contained within a chamber of given capacity.

One of the objects of the present invention is to provide a construction, such that relatively large openings can be secured, while at the same time maintaining substantially the same amount or mass of heat absorbing material within a given space, as it has been customary to secure in the past with relatively smaller openings.

Another object of the invention is to combine the aforementioned advantage or object with a construction, wherein the ordinary type of regenerator construction may be used on the outgoing side. This will make it possible to modify or change the present regenerator constructions in such a manner as to incorporate within them the desirable features of the present invention.

Other objects and uses will appear from a detailed description of the invention which consists in the features of construction and combination of parts, hereinafter described and claimed.

Referring to drawings—

Figure 1 shows a vertical longitudinal section through a regenerator construction, embodying the features of the present invention;

Fig. 2 shows a horizontal section taken on the line 2—2 of Fig. 1, looking in the direction of the arrows;

Fig. 3 shows a vertical cross-section, taken on the line 3—3 of Fig. 1, looking in the direction of the arrows;

Fig. 4 shows a fragmentary longitudinal section through a portion of the checker work construction, embodying the features of the present invention;

Fig. 5 shows a horizontal section through the construction shown in Fig. 4;

Fig. 6 shows a fragmentary longitudinal vertical section through a modified form of construction, embodying the features of the present invention;

Fig. 7 shows a vertical cross-section taken on the line 7—7 of Fig. 6, looking in the direction of the arrows;

Fig. 8 shows a fragmentary vertical longitudinal section through another modified construction; and Fig. 9 shows a fragmentary vertical longitudinal section through still another modified construction.

In the ordinary type of checker work construction, as used in regenerators, bricks or blocks are located in alternate courses, lying at right angles to each other, so that the observer, looking down upon a mass of such checker work, sees a series of blocks lying at right angles to each other and providing between them square openings or holes. As previously pointed out, this construction presents the disadvantage that the sizes of the openings, for blocks of given size cannot be increased without sacrificing the amount of regenerator material contained within a given space. I have discovered the fact that if certain of the blocks which are ordinarily laid crosswise, be laid longitudinally, the size of the openings can be increased without in any manner reducing the mass of regenerator material.

Referring now particularly to the construction shown in Figs. 1, 2 and 3 of the drawings, the regenerator chamber is designated by the numeral 10. The flue leading to the furnace is designated by the numeral 11, and the discharge connection by the numeral 12. In the lower portion of the chamber are the rider walls 13, which provide between them the horizontal flues or passages 14 in communication with the discharge opening 12. Supported on the rider walls are a plurality of cross-members 15, which in turn support the regenerator material. If desired, the lower portion 16 of the mass of said material may be of the ordinary type, and I have illustrated such construction in the several figures. In said figures I have illustrated the features of the present invention as being applied only to the incoming or upper portion of the regenerator material, but manifestly if desired, the features of the present invention might be carried throughout the entire construction. The upper portion of the regenerator material comprises a series of parallel walls 17, extending throughout the desired portion of the height of the regenerator, and said walls may be bound together periodically or as frequently as desired by means of the binders 18. It will be observed from examination of Figs. 1 and 2 in particular, that the openings between the walls 17 and the binders 18 are relatively large, being elongated, instead of square.

Reference to Figs. 4 and 5 show in detail the manner in which this wall may be built up. Alternate ones of the longitudinal courses 19 may be laid with their blocks in solid abutment as illustrated in Fig. 4 or with slight spaces between them, as desired. The intermediate courses 20 are laid with selected ones of their blocks lying crosswise, so that said blocks extend between the adjacent walls and constitute binders between said walls. In the particular arrangement illustrated, these binding blocks are binding blocks 21, and when the exact arrangement shown in Figs. 4 and 5 is used, the positioning of the blocks 21 will leave the openings 22 in the courses 20. These openings 22 will serve to permit a free interchange of gas back and forth throughout the mass of regenerator material, so that while the gas will be divided up more or less into separate sheets or streams, still a desired amount of equalizing effect may take place.

Referring again to Fig. 1, it will be observed that the rear ends of the walls 17 are shown as being of greater elevation than the front ends of said walls. This arrangement gives additional or increased regenerator capacity in the rear end of the chamber, and is permissible because the amount of gas flowing horizontally, continually decreases as the rear portion of the chamber is approached, the gas descending uniformly into the body of the heat absorbing material.

Reference to Figs. 6 and 7 reveals a construction in which all the courses of walls are built up within spaces between the blocks, so that a still more perfect interchange of gas may take place through said walls, than with the arrangement previously described. Also in the arrangement shown in Figs. 6 and 7 there are provided one or more flues or passages 23, extending vertically through the mass of heat absorbing material, and creating an additional tendency for the gases to flow down at the points where they are located. By the use of such passages, placed at the desired locations in the body of the material, the uniformity of gas flow may be improved.

Reference to Figs. 6 and 7 shows that at the extreme upper portion of the structure the longitudinal walls are completely separated from each other so that the cross-sectional area of the passages in the upper portion of the structure is equal to the length of the walls multiplied by the distance between adjacent walls. Commencing substantially at the fifth course the binders 18 serve to subdivide the passages into comparatively large openings, and commencing substantially at the twelfth course the binders 18 are placed very much closer together, so that the vertical openings are still further reduced. Commencing substantially at the sixteenth course the structure becomes a checker work with openings of still smaller size, which continue downward as far as may be desired. It will thus be observed that in the particular arrangement illustrated the vertical passages taper in size as they descend, becoming progressively smaller in dimensions. The tendency for the dust to cinder on is greatest on the incoming side of the structure where the gases are hottest, and said tendency decreases as the discharged side of the structure is approached. By thus progressively reducing the size of the openings in the direction of gas flow, the varying tendency of the dust to cinder onto the structure will be neutralized to a great extent, so that after a given period of run the openings will become of substantially uniform cross-section throughout their length. In this way a maximum amount of cindering can be provided for without undue reduction of cross-sectional area, while at the same time using a maximum amount of heat absorbing material within the structure.

Referring to the construction shown in Fig. 8, it will be observed that the binders between the walls are merged together so as to provide the vertical partitions 24, between which are the vertical flues or passages 25. A similar construction is shown in Fig. 9, with the exception that the partitions 24 slant forward as they descend instead of extending straight down. It will be observed from examination of Fig. 8 that beneath the walls 24 or their equivalent, are redistribution passages 26, by means of which the gases flowing downward may redistribute as they enter the lower portion of the structure.

I wish to emphasize the desirability of enlarging the openings between the blocks of the regenerator material, particularly on the incoming side of the structure. By the use of the principle herein disclosed, the size of the openings may be very materially increased in desired portions of the structure, without any change in the regenerator capacity of such portions. Furthermore it will be readily apparent that a given thickness of dust collection or cindering around the surfaces of openings of given size, will produce a very much less reduction of gas passage than will be occasioned by a deposit of like thickness on the surfaces of openings of smaller size. For example: a deposit of one-half inch of material on each of the four surfaces of an opening originally 5.5 inches square will reduce the size of gas passage from 30.25 square inches to 20.25 square inches, whereas a deposit of one-half inch of dust on each of the four surfaces of an opening originally 5.5 inches by 16.5 inches will cause a reduction of available gas passage from 90.75 square inches to 69.75 square inches. In the first case the available gas passage is reduced to 66.9%, whereas in the second case the available gas passage is reduced only to 76.9%. For a thicker deposit of material, the comparison would be still more striking.

While I have herein shown and described only certain forms of construction embodying the features of the present invention, still it will be understood that I am not limited to said constructions, but that I contemplate within the scope of my invention other equivalent forms, operating in equivalent manners, to produce equivalent results.

I claim:

1. In a regenerator the combination with an inclosing chamber, of a suitable heat absorbing structure within the same, a plurality of parallel walls mounted on the upper portion of said heat absorbing structure, and binders connecting said walls together and leaving elongated vertical passages between the walls and binders.

2. In a regenerator the combination with an inclosing chamber of a suitable heat absorbing structure within the same, a plurality of parallel walls on the upper portion of said heat absorbing structure, and binders extending between adjacent ones of said walls, said binders being so positioned that adjacent binders in any given horizontal plane lie farther apart than the distance between the walls which they bind together.

3. In a regenerator the combination with an inclosing chamber, of a suitable heat absorbing structure within the same, a plurality of parallel walls on the upper portion of said structure, and means for securing said walls against lateral displacement, the vertical openings between the walls being of substantially greater longitudinal dimension than the distance between the walls.

4. In a regenerator the combination with an inclosing chamber, of a suitable heat absorbing structure within the same, a plurality of parallel walls on the upper portion of the same, and the binders between adjacent walls, serving to bind them together, said binders being located in vertical rows separated a horizontal distance greater than the distance between the walls which they bind together.

5. In a regenerator the combination with an inclosing chamber, of a suitable heat absorbing structure within the same, a plurality of parallel walls on the upper portion of said heat absorbing structure, and vertical partitions extending between said walls and serving to bind them together, said partitions being separated a horizontal distance, greater than the distance between the walls which they bind together.

6. In a regenerator the combination with an inclosing chamber, of a suitable heat absorbing structure within the same, a plurality of parallel walls on said heat absorbing structure, and binders extending between alternate courses of adjacent walls, adjacent binders being separated a distance greater than the distance between the walls which they bind together.

FRANK ORTH.

Witnesses:
 FRANCES M. FROST,
 THOMAS A. BANNING, Jr.

Copies of this patent may be obtained for five cents each, by addressing the "Commissioner of Patents, Washington, D. C."